(12) United States Patent
Verbeke et al.

(10) Patent No.: US 11,808,591 B2
(45) Date of Patent: Nov. 7, 2023

(54) AFFECTIVE-COGNITIVE LOAD BASED NAVIGATION

(71) Applicant: HARMAN INTERNATIONAL INDUSTRIES, INCORPORATED, Stamford, CT (US)

(72) Inventors: Joseph Verbeke, San Francisco, CA (US); Stefan Marti, Oakland, CA (US); Sven Kratz, Saratoga, CA (US); Adam Boulanger, Palo Alto, CA (US); Neeka Mansourian, El Dorado Hills, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 250 days.

(21) Appl. No.: 16/893,292

(22) Filed: Jun. 4, 2020

(65) Prior Publication Data

US 2021/0381839 A1 Dec. 9, 2021

(51) Int. Cl.
*G01C 21/34* (2006.01)
*G01C 21/36* (2006.01)

(52) U.S. Cl.
CPC ..... *G01C 21/3461* (2013.01); *G01C 21/3407* (2013.01); *G01C 21/3661* (2013.01)

(58) Field of Classification Search
CPC ...... G01C 21/005; G01C 21/00; G01C 21/14; G01C 21/1656; G01C 21/34; G01C 21/3407; G01C 21/3415; G01C 21/343; G01C 21/3446; G01C 21/3453; G01C 21/3461; G01C 21/3476; G01C 21/3484; G01C 21/3492; G01C 21/36; G01C 21/3602; G01C 21/3605; G01C 21/3608; G01C 21/3611; G01C 21/3614; G01C 21/3617; G01C 21/3623; G01C 21/3626; G01C 21/3629; G01C 21/3641; G01C 21/3647; G01C 21/3652; G01C 21/3679; G01C 21/3682; G01C 21/3691; G01C 21/3694; G01C 21/38; G01C 21/3804; G01C 21/3807; G01C 21/3811; G01C 21/3815; G01C 21/3822; G01C 21/3833; G01C 21/3837; G01C 21/3841; G01C 21/3848; G01C 21/3852; G01C 21/3856; G01C 21/3885; G01C 21/3889; G01C 21/3896; G01C 21/3661; A61B 5/165; A61B 2503/22

See application file for complete search history.

(56) References Cited

U.S. PATENT DOCUMENTS

| 9,625,266 | B1* | 4/2017 | Chintakindi ....... G01C 21/3484 |
| 2018/0080785 | A1 | 3/2018 | Han et al. |
| 2018/0281812 | A1 | 10/2018 | Tochioka et al. |
| 2019/0162549 | A1* | 5/2019 | Fouad ................ G08G 1/09626 |
| 2019/0182619 | A1* | 6/2019 | Dhanabalan ......... G01C 21/005 |
| 2019/0232974 | A1 | 8/2019 | Reiley et al. |

(Continued)

*Primary Examiner* — Adam R Mott
*Assistant Examiner* — Erick T. Detweiler
(74) *Attorney, Agent, or Firm* — Artegis Law Group, LLP

(57) ABSTRACT

Embodiments of the present disclosure sets forth a computer-implemented method comprising obtaining a starting location and a destination location, determining a plurality of routes from the starting location to the destination location, obtaining affective-cognitive load (ACL) data associated with the plurality of routes, selecting a route included in the plurality of routes based on the ACL data, and transmitting the selected route for output.

18 Claims, 7 Drawing Sheets

(56) References Cited

U.S. PATENT DOCUMENTS

| | | |
|---|---|---|
| 2020/0242421 A1 | 7/2020 | Sobhany |
| 2021/0221404 A1 | 7/2021 | Reiner et al. |
| 2021/0237714 A1 | 8/2021 | Hewitt et al. |
| 2021/0309252 A1 | 10/2021 | Boulanger et al. |
| 2021/0309253 A1 | 10/2021 | Verbeke et al. |

* cited by examiner

AFFECTIVE-COGNITIVE LOAD BASED NAVIGATION

BACKGROUND

Field of the Various Embodiments

The various embodiments relate generally to navigation systems, and more specifically, to affective-cognitive load based navigation.

DESCRIPTION OF THE RELATED ART

Drivers often use navigation systems while driving a vehicle. Given a starting location and a destination location, a navigation system determines one or more routes that may be used by the driver to drive the vehicle from the starting location to the destination location. The driver may select one of the determined routes that are offered by the navigation system, and the navigation system provides guidance (e.g., turn-by-turn directions) for the selected route.

Navigation systems conventionally determine the routes that may be offered to the driver based on time and/or distance criteria. For example, the navigation system determines which routes from the starting location to the destination location are the fastest and/or has the shortest distance. Navigation systems may optionally use additional, specific criteria for determining routes (e.g., avoidance of toll roads and/or ferries). Navigation systems may further account for traffic conditions when determining which routes are the fastest and/or shortest.

A drawback of these conventional approaches implemented by navigation systems is that the navigation system is not aware of whether a route may pose a cognitive and/or emotional challenge on the driver, whether the driver is concerned that a route may be cognitively and/or emotionally challenging, or whether the driver desires a route that is more cognitively and/or emotionally challenging. Certain roads and/or routes may be more cognitively and/or emotionally burdensome, demanding, and/or challenging than other roads and/or routes for various reasons (e.g., road configuration, traffic conditions, time of day, and/or the like). Such roads and/or routes demand additional focus on the part of the driver, and the driver may be unready for or uninterested in bearing that demand for additional focus. Because the navigation system is unaware of the cognitive and/or emotional challenges of a route, the navigation system may offer to the driver routes that are unnecessarily cognitively and/or emotionally burdensome on the driver.

As the foregoing illustrates, what is needed are more effective techniques for providing routes from a starting location to a destination location.

SUMMARY

One embodiment sets forth a computer-implemented method comprising obtaining a starting location and a destination location, determining a plurality of routes from the starting location to the destination location, obtaining affective-cognitive load (ACL) data associated with the plurality of routes, selecting a first route included in the plurality of routes based on the ACL data, and transmitting the first route for output.

One embodiment sets forth a computer-implemented method comprising obtaining a starting location and a destination location, determining a route from the starting location to the destination location, obtaining affective-cognitive load (ACL) data associated with the route, generating affective-cognitive (AC) quality information associated with the route based on the ACL data, and transmit the route and the AC quality information for output.

Further embodiments provide, among other things, one or more computer-readable media and system configured to implement the methods set forth above.

At least one technical advantage of the disclosed techniques relative to the prior art is that the disclosed techniques use affective-cognitive load data to evaluate various routes from a starting location to a destination location, in order to account for the cognitive and/or emotional load burdens of navigating different routes. In particular, with the disclosed techniques, affective-cognitive load metrics can be determined for various routes, and routes can be selected based on these affective-cognitive load metrics. Accordingly, the disclosed techniques enable navigation that is less cognitive and/or emotional burdensome on the user compared to prior art approaches, thus facilitating the safety and well-being of the user.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
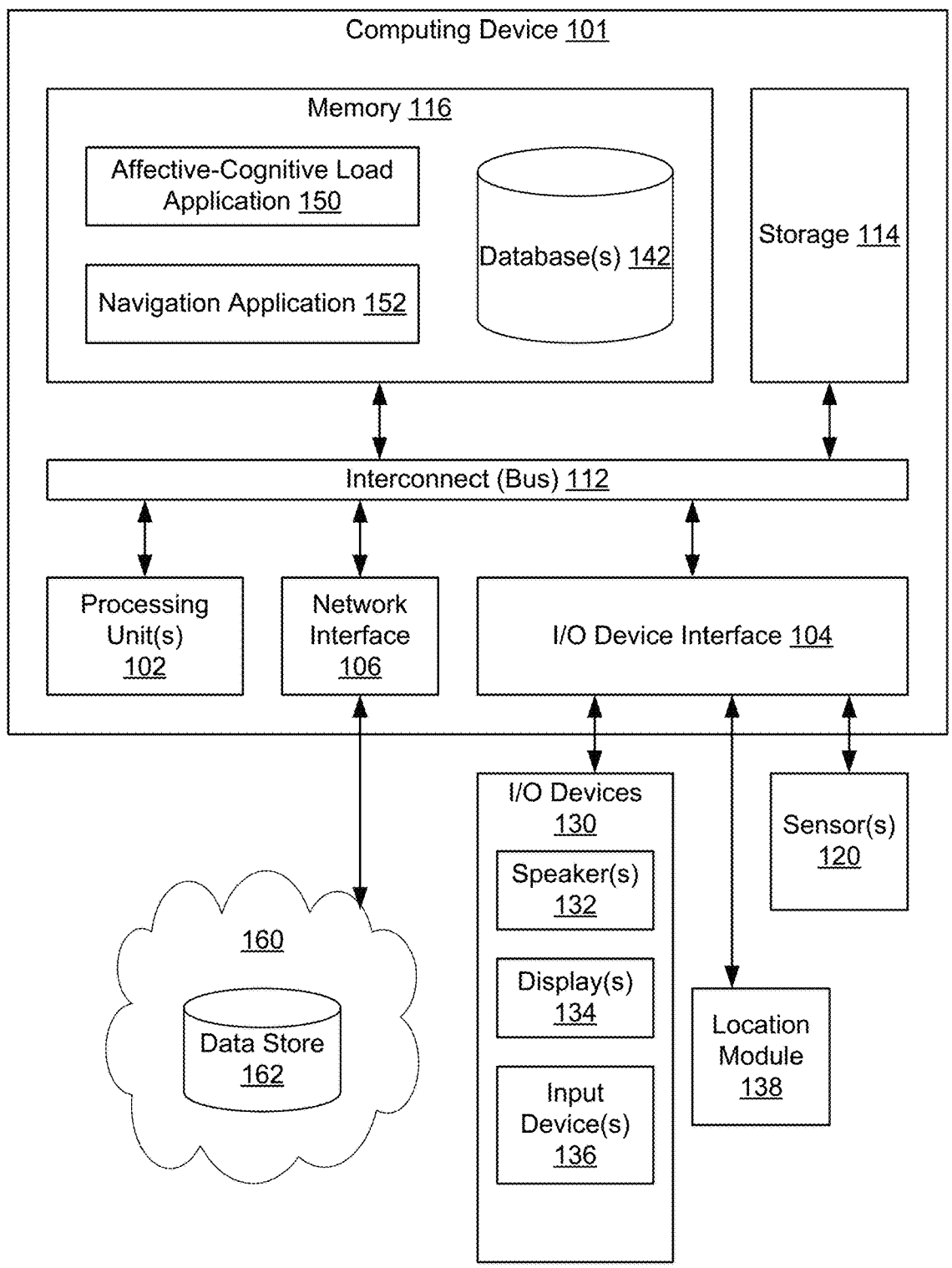
FIG. 1 illustrates a block diagram of a navigation system configured to implement one or more aspects of the present disclosure.

FIG. 1 illustrates a block diagram of navigation system 100 configured to implement one or more aspects of the present disclosure. As shown, navigation system 100 includes, without limitation, computing device 101, sensor(s) 120, input/output (I/O) device(s) 130, location module 138, and network 160. Computing device 101 includes a processing unit 102, I/O device interface 104, network interface 106, interconnect (bus) 112, storage 114, and memory 116. Memory 116 stores navigation application 152, database(s) 142, and optionally affective-cognitive load (ACL) application 150. Network 160 includes data store 162. Processing unit 102, I/O device interface 104, network interface 106, storage 114, and memory 116 can be communicatively coupled to each other via interconnect 112.

In some embodiments, in operation, processing unit 102 receives sensor data from sensor(s) 120. Processing unit 102 executes affective-cognitive load application 150 in order to process the sensor data and determine various biometric values associated with the psychophysiological state of a user (e.g., a driver of a vehicle). Such biometric values include a cognitive load that estimates an amount of brain activity that a user is employing, and an affective load that estimates an emotion (specified as a pre-defined emotion or a set of emotion parameterized metrics associated with a psychophysiological state) that a user is experiencing. In various embodiments, the affective load may include one or more separate emotional metrics, such as separate arousal, valence, and/or dominance values. Additionally or alternatively, the affective load may comprise one or more discrete emotional states and/or associated values of each. Upon determining biometric values for a user, affective-cognitive load application 150 combines the biometric values via one or more estimation algorithms to determine an affective-cognitive load (ACL) as a composite of the biometric values. Affective-cognitive load application 150 associates the ACL with location and timestamp information and transmits the ACL and the location and timestamp information to database(s) 142 and/or data store 162 for storage. Database(s) 142 can store ACL data for the driver of the vehicle, and data store 162 can store ACL data for multiple drivers of different vehicles and associated with different locations and dates/times. In some embodiments, database(s) 142 can also store ACL data for drivers of other vehicles (e.g., ACL data of other drivers downloaded from data store 162).

In operation, processing unit 102 executes navigation application 152 to provide navigation services, including determining and offering possible routes to navigate from one location to another location. Navigation application 152 obtains a starting location and a destination location for navigation in any technically feasible manner. For example, navigation application 152 could obtain the starting location from user input or automatically (e.g., the user manually inputs or selects a starting location via a user interface of navigation application 152, navigation application 152 determines a current location via location module 138). As another example, navigation application 152 could obtain the destination location from user input or automatically as well (e.g., the user manually inputs or selects a destination location via the user interface of navigation application 152, navigation application 152 automatically determines a likely destination location based on a user profile). Navigation application 152 determines possible routes from the starting location to the destination location. For example, navigation application 152 could analyze a navigation database stored in database(s) 142 to identify routes from the starting location to the destination location on a map. Navigation application 152 obtains ACL data associated with those routes and evaluates the routes based on the ACL data, and accordingly determines ACL metrics for the routes. Navigation application 152 selects one or more routes that have better ACL metrics alone or in conjunction with one or more other criteria (e.g., time to destination, distance). Navigation application 152 transmits the selected routes for output to the user (e.g., transmitted to a display device for display in a user interface). In some embodiments, navigation application 152 additionally can detect that an ACL of the user has exceeded a threshold, and in response determine and select an alternate route based on ACL metrics compared to the current route.

As noted above, computing device 101 can include processing unit 102 and memory 116. Computing device 101 can be a device that includes one or more processing units 102, such as a system-on-a-chip (SoC). In various embodiments, computing device 101 may be a mobile computing device, such as a tablet computer, mobile phone, media player, and so forth. In some embodiments, computing device 101 may be a head unit included in a vehicle system. Generally, computing device 101 can be configured to coordinate the overall operation of navigation system 100. The embodiments disclosed herein contemplate any technically feasible system configured to implement the functionality of navigation system 100 via computing device 101.

Various examples of computing device 101 include computing devices, (desktop computers, etc.), mobile devices (e.g., cellphones, smartphones, tablets, laptops, etc.), wearable devices (e.g., watches, headsets, etc.), consumer products (e.g., gaming devices, media devices, etc.), smart home devices (e.g., digital assistants, smart displays, etc.), vehicle computing devices (e.g., head units, in-vehicle navigation systems), and so forth. Computing device 101 may be located in various environments including, without limitation, home environment (e.g., office, kitchen, etc.), road vehicle environments (e.g., consumer car, commercial truck, etc.), aerospace and/or aeronautical environments (e.g., airplanes, helicopters, spaceships, etc.), nautical and submarine environments, and so forth.

Processing unit 102 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and/or the like. Processing unit 102 generally comprises a programmable processor that executes program instructions to manipulate input data. In some embodiments, processing unit 102 may include any number of processing cores, memories, and other modules for facilitating program execution. For example, processor unit 102 could receive input from a user via I/O devices 130 and generate pixels for display on an I/O device 130 (e.g., a display device 134). In some embodiments, processing unit 102 can be configured to execute navigation application 152 in order to provide navigation services (e.g., determine possible routes) and optionally affective-cognitive load application 150 in order to analyze acquired sensor data and determine an ACL of the user for a given location and time. In some embodiments, navigation application 152 may output the determined routes to one or more I/O modules 130 for output to the user (e.g., displayed in a user interface of navigation application 152). In some embodiments, affective-cognitive load application 150 can transmit determined ACLs to database(s) 142 and/or data store 162 for storage, and optionally to navigation application 152 in order navigation application 152 to respond to ACLs of the user.

Storage 114 can include non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like. For example, navigation application 152, ACL application 150, and database(s) 142 could be stored in storage 114, and then loaded into memory 116 as needed.

Memory 116 can include a memory module or collection of memory modules. Memory 116 generally comprises storage chips such as random access memory (RAM) chips that store application programs and data for processing by processing unit 102. Processing unit 102, I/O device interface 104, and network interface 106 can be configured to read data from and write data to memory 116. In some embodiments, separate data stores, such as data store 162 included in network 160 ("cloud storage") may supplement memory 116. Navigation application 152 and ACL application 150 can be loaded from storage 114 into memory 116. While in memory 116, navigation application 152 and ACL application 150 can be executed by processing unit 102 to implement the functionality described in the present disclosure.

ACL application 150 processes sensor data associated with a user and/or environment in order to determine various metrics associated with brain activity and/or emotion of the user. In various embodiments, ACL application 150 may receive sensor data from one or more sensors 120 and may analyze the sensor data in order to determine the cognitive load of the user and/or the affective load, which may include separate emotional parameters that indicate the emotion being experienced by the user. ACL application 150 determines, based on both the cognitive load and the affective load, an affective-cognitive load (ACL) of the user that indicates the user's overall mental activity and ability to manage a set of tasks. ACL application 150 can associate an ACL with geolocation and timestamp information corresponding to the location and time of the sensor data, and transmit the ACL and associated geolocation and timestamp information to one or more storage locations (e.g., database(s) 142, data store 162, and/or the like) for storage. In some embodiments, ACL application 150 may compare the ACL with other ACL values and/or thresholds. For example, ACL application 150 may determine that a current ACL of the user is above a maximum threshold level required to successfully navigate a current route to a destination location. ACL application 150 could then signal navigation application 152 to determine an alternate route that places less burden on the ACL of the user.

Navigation application 152 provides navigation services to users of navigation system 100. In various embodiments, navigation application 152 obtains a starting location and a destination location and determines one or more routes to navigate from the starting location to the destination location. Navigation application 152 evaluates the routes based on various criteria. In various embodiments, navigation application 152 evaluates the routes based on attentive-cognitive load. That is, navigation application 152 obtains ACL data associated with the routes and determines ACL metrics for the routes. The ACL metrics represent aggregations of ACL along a given route, in order to measure an ACL burden that a route may pose to a user. ACL metrics for a given route could include, for example, a cumulative ACL, a mean (e.g., arithmetic mean) ACL, a mode ACL, and/or a median ACL. Navigation application 152 selects one or more routes that have ACL metrics that indicate a lower ACL burden on the user, and transmits those selected routes (e.g., to a display device 134) for presentation to the user. In some embodiments, navigation application 152 may select routes without considering ACL metrics, but may nevertheless present indications of the ACL metrics of the selected routes to the user. Also, in some embodiments, while the vehicle is traversing a route determined by navigation application 152, navigation application 152 may determine that a current ACL of the user (e.g., the driver) has exceeded a threshold. In response, navigation application 152 can determine an alternate route that may pose a lower ACL burden, and transmit the alternate route to the user.

Database(s) 142 can store values and other data retrieved by processing unit 102 to coordinate the operation of navigation application 152 and/or ACL application 150. Database(s) 142 may be stored in storage 114 and loaded into memory 116 as needed. In various embodiments, processing unit 102 may be configured to store values in database(s) 142 and/or retrieve values stored in database(s) 142. For example, database(s) 142 could store historical ACL values, lookup tables, ACL algorithms, ACL thresholds, mappings of sensor values to emotional parameterized metrics, mappings of ACL values to driver readiness levels, and so forth. In some embodiments, database(s) 142 may store values retrieved from data store 162. In such instances, database(s) 142 may receive periodic updates and provide values to navigation application 152 and/or ACL application 150 between the periodic updates.

In various embodiments, database(s) 142 can include one or more lookup tables, where the lookup tables store entries that include mappings between values. For example, database(s) 142 could include a set of ACL lookup tables that includes entries of mappings of biometric values (e.g., cognitive load, affective load, arousal, valence, dominance, etc.), to ACL values. Additionally or alternatively, database(s) 142 can include a set of ACL lookup tables that maps biometric values to pre-defined ACL levels (e.g., high ACL, medium ACL, low ACL, etc.), and/or a set of ACL lookup tables that maps pre-defined biometric values (e.g., a defined value for the psychophysiological trait of "angry") to specific ACL values and/or pre-defined ACL levels.

In various embodiments, ACL values or levels in database(s) 142 are stored along with corresponding location and timestamp information. The location information (e.g., latitude-longitude coordinates, road and/or address information, geolocation information) and timestamp information for an ACL value indicate the location and time when the sensor readings from which the ACL value is derived is taken by sensors 120. Accordingly, ACL values or levels in database(s) 142 may be filtered and selectively retrieved by location, date, and/or time.

Database(s) 142 can also include a navigation database, which stores navigation data that may be used by navigation application 152. The navigation data in the navigation database includes, for example, maps, road information, landmark information, address information, and so forth. In some embodiments, the navigation data includes a road network graph, which stores the road information as a mathematical graph of nodes and edges. In some embodiments, the navigation data also includes historical traffic information (e.g., traffic trends by day and time), real-time traffic information, and/or the like. In some embodiments, database(s) 142 may store a navigation database retrieved from data store 162. In such instances, database(s) 142 may receive periodic updates to the navigation database from data store 162.

Sensor(s) 120 may include one or more devices that perform measurements and/or acquire data related to certain subjects in an environment. In various embodiments, sensor(s) 120 may generate sensor data that is related to the cognitive load and/or affective load of the user. For example, sensor(s) 120 could collect biometric data related to the user (e.g., heart rate, brain activity, skin conductance, blood oxygenation, pupil size, eye motion, galvanic skin response, blood-pressure level, average blood glucose concentration, etc.). Additionally or alternatively, sensor(s) 120 can generate sensor data related to objects in the environment that are not the user. For example, sensor(s) 120 could generate sensor data about the operation of a vehicle, including the speed of the vehicle, pedal position, steering wheel position, ambient temperature in the vehicle, amount of light within the vehicle, and so forth. In some embodiments, sensor(s) 120 may be coupled to and/or included within computing device 101 and send sensor data to processing unit 102. Processing unit 102 executes ACL application 150 in order to determine affective-cognitive loads that are derived from the acquired sensor data.

In various embodiments, sensor(s) 120 may acquire sensor data that ACL application 150 processes in order to classify an emotion that the user is experiencing. For example, sensor(s) 120 could include a user-facing camera that records the face and/or the eyes of the user as image data. ACL application 150 could then analyze the image data in order to determine the facial expression of the user, and then map the facial expression to a specific emotion. In another example, sensor(s) 120 could include sensors in various parts of the vehicle (e.g., driver's seat passenger seat, steering wheel, etc.) that acquire biological and/or physiological signals of a user (e.g., perspiration, heart rate, heart-rate variability (HRV), blood flow, blood-oxygen levels, breathing rate, galvanic skin response (GSR), sounds created by a user, behaviors of a user, etc.). In such instances, ACL application 150 could compute one or more quantitative emotional parameterized metrics, such as emotional arousal (A), emotional valence (V), and/or emotional dominance that indicate the emotion the user is experiencing.

In various embodiments, sensor(s) 120 may also acquire data that ACL application 150 processes in order to compute a cognitive load that a user is experiencing. For example, sensor(s) 120 could include a pupil sensor (e.g., a camera focused on the eyes of the user) that acquires image data about at least one pupil of the user. ACL application 150 could then perform various pupillometry techniques to detect eye parameters (e.g., fluctuations in the user's pupil diameter, direction of the pupil is gazing, eye lid position, etc.) in order to estimate a cognitive load (CL) of the user. In another example, sensor(s) 120 could include heart rate sensors and/or other biometric sensors that acquire biological and/or physiological signals of the user (e.g., heart rate, breathing rate, eye motions, GSR, neural brain activity, etc.). In such instances, ACL application 150 could compute the cognitive load from one or more of the acquired biological and/or physiological signals.

In various embodiments, sensor(s) 120 may include imaging sensors, such as RGB cameras, infrared cameras, depth cameras, and/or camera arrays, which include two or more of such cameras. Other imaging sensors may include imagers, laser sensors, ultrasound sensors, radar sensors, and/or LIDAR sensors. In some embodiments, sensor(s) 120 may include physical sensors, such as touch sensors, pressure sensors, position sensors (e.g., an accelerometer and/or an inertial measurement unit (IMU)), motion sensors, and so forth, that register the body position and/or movement of the user. In such instances, ACL application 150 may analyze the acquired sensor data to determine the movement of the user, and then correlate such movement with specific emotions (e.g., boredom, fatigue, arousal, etc.) and/or a cognitive load of the user.

In various embodiments, sensor(s) 120 may include physiology sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, and so forth. In various embodiments, ACL application 150 may execute spectral entropy, weighted mean frequency, bandwidth, and/or spectral edge frequency to determine cognitive load from the acquired sensor data.

In addition, in some embodiments, sensor(s) 120 may include acoustic sensors, such as a microphone and/or a microphone array that acquires sound data. Such sound data may be processed by ACL application 150 performing various natural language (NL) processing techniques, sentiment analysis, and/or speech analysis in order to determine the semantic meaning of the phrases spoken in the environment and/or infer emotional parameterized metrics from the semantic meaning. In another example, ACL application 150 could analyze the acquired sound data using voice-tone analysis in order to infer emotion from the speech signal included in the sound data. In some embodiments, ACL application 150 may execute various analysis techniques relating to the spectral centroid frequency and/or amplitude of the sound signal in order to classify the sound signal to a specific value for the cognitive load.

In some embodiments, sensor(s) 120 may include behavioral sensors that detect the activity of the user within the environment. Such behavioral sensors may include devices that acquire related activity data, such as devices that acquire application usage data and/or mobile device usage data. In such instances, ACL application 150 may estimate the cognitive load and/or the emotional parameterized metrics by determining the activities in which the user is currently engaged. For example, a given application could be classified as being a fun, social application in which a user engages when happy and active, and/or is making the user happy and active. In such instances, ACL application 150 could correlate the usage of the given application with a pre-defined emotion (e.g., excited) and/or pre-defined emotional parameterized metrics (a high arousal value and a positive valence value).

I/O device(s) 130 may include devices capable of receiving input, such as a keyboard, a mouse, a touch-sensitive screen, a microphone and other input devices for providing input data to computing device 101. In various embodiments, I/O device(s) 130 may include devices capable of providing output, such as a display screen, one or more speakers (e.g., a loudspeaker array for spatial sound generation, ultrasound speakers for highly directional sound generation), haptic devices, touchless haptic devices (e.g., for creating haptic sensations at a distance), and/or the like. One or more of I/O devices 130 can be incorporated in computing device 101 or may be external to computing device 101. I/O devices 130 interface with computing device 101 via I/O devices interface 104. In some embodiments, computing device 101 and/or one or more I/O device(s) 130 may be components of an infotainment and navigation system implemented in a vehicle. In various embodiments, ACL application 150 may determine a cognitive load and/or an emotional load based on inputs received by one or more I/O devices 130. For example, the vehicle could include a head unit that includes a user interface. In such instances, ACL application 150 could determine the cognitive load and/or the emotional load of the user based on one or more inputs received via the head unit.

In various embodiments, I/O devices 130 include one or more audio speakers 132, one or more display devices 134, and one or more input devices 136. Examples of display devices 134 include, without limitation, LCD displays, LED displays, heads-up displays, head-mounted displays, and touch-sensitive screens. Examples of input devices 136 include, without limitation, buttons, knobs, dials, a touchpad, a touch-sensitive screen, joysticks, and a microphone. Additionally, I/O devices 130 may include other devices capable of receiving input and/or output.

Network 160 may enable communications between computing device 101 and other devices in network via wired and/or wireless communications protocols, satellite networks, V2X networks, including Bluetooth, Bluetooth low energy (BLE), wireless local area network (WiFi), cellular protocols, and/or near-field communications (NFC). Network 160 is any technically feasible type of communications network that allows data to be exchanged between computing device 101 and remote systems or devices (e.g., data store 162), such as a server, a cloud computing system, cloud-based storage, or other networked computing device or system. For example, network 160 could include a wide area network (WAN), a local area network (LAN), a wireless network (e.g., a Wi-Fi network, a cellular data network), and/or the Internet, among others. Computing device 101 connects with network(s) 160 via network interface 106. In some embodiments, network interface 106 is hardware, software, or a combination of hardware and software, that is configured to connect to and interface with network(s) 160. In various embodiments, network 160 may include one or more data stores 162 that store data associated with sensor data, biometric values, and/or affective-cognitive loads (e.g., ACL values along with corresponding location and timestamp information). In various embodiments, ACL application 150 and/or navigation application 152 may retrieve information from the data store 162. In such instances, ACL application 150 may analyze the retrieved data as part of determining the ACL of the user, comparing the ACL to situations that involve specific ACL values, and so forth. Navigation application 152 may analyze the retrieved data as part of determining ACL metrics for routes and routes with better ACL metrics.

Location module 138 includes hardware and/or software components for determining a geographic location of computing device 101 (e.g., a current location of the vehicle). Location module 138 may determine a location of computing device 101 via acquisition of geolocation data (e.g., from a global navigation satellite system, such as a global positioning system (GPS), Glonass, Galileo, Beidou, etc.) and/or determination of location based on sensor data from sensors 120 (e.g., dead reckoning). Location module 138 may also cross-reference an acquired and/or determined geographic location with the navigation database in database(s) 142 to determine address information corresponding to the geographic location.

Affective-Cognitive Load Sub-System

Figure 2:
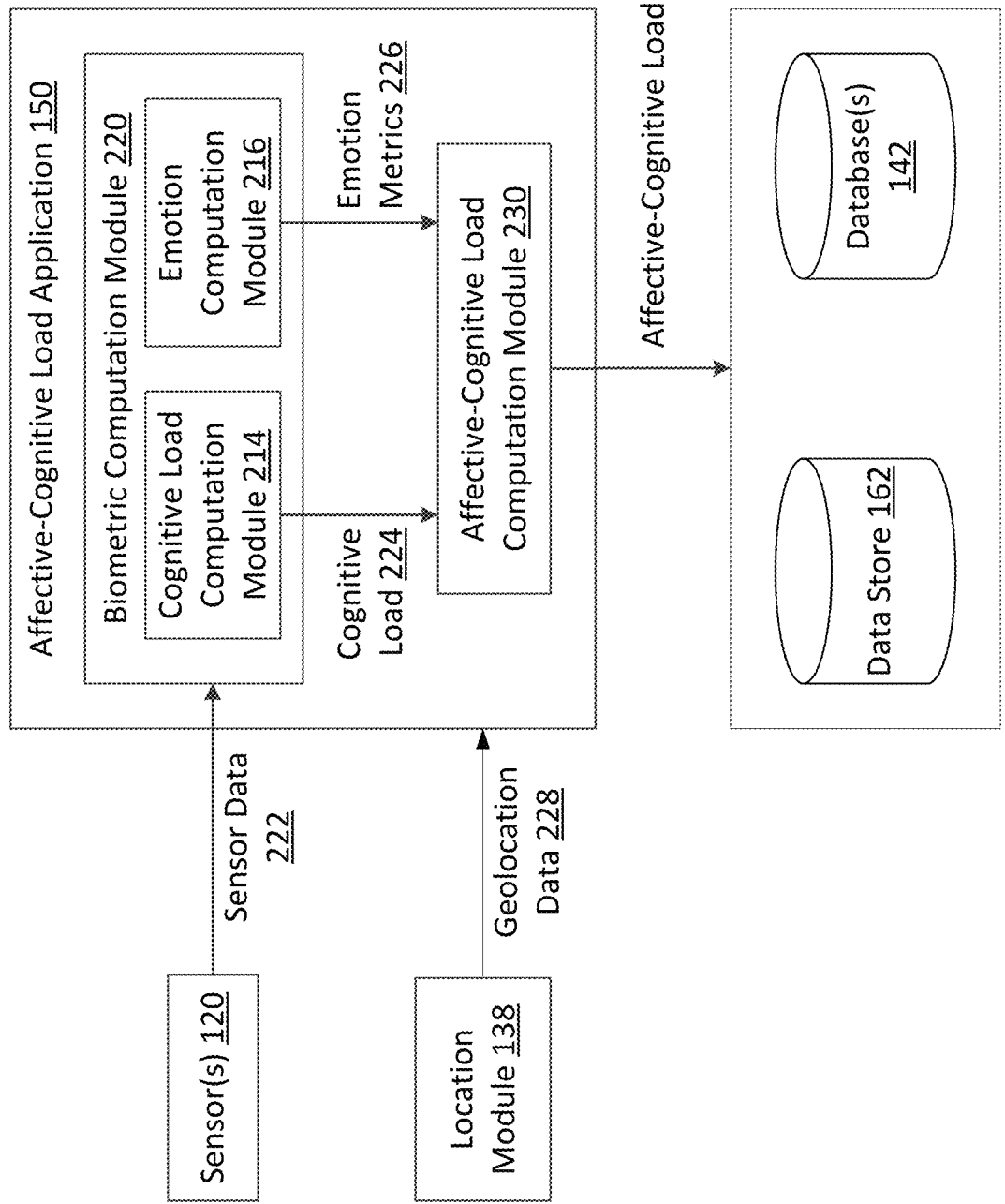
FIG. 2 illustrates a block diagram of the attentive-cognitive load application of FIG. 1, according to various embodiments.

FIG. 2 illustrates an affective-cognitive load sub-system 200 included in the navigation system 100 of FIG. 1, according to various embodiments. As shown, affective-cognitive load sub-system 200 includes sensor(s) 120, ACL application 150, and database(s) 142 and/or data store 162. ACL application 150 includes biometric computation module 220 (including cognitive load computation module 214 and emotion computation module 216) and affective-cognitive load computation module 230.

In operation, biometric computation module 220 includes various modules 214, 216 that analyze sensor data 222 received from sensor(s) 120 in order to determine one or more biometric values, including cognitive load 224 and/or emotion metrics 226. Biometric computation module 220 sends biometric values 224, 226 to affective-cognitive load computation module 230 that performs one or more algorithmic techniques in order to determine an affective-cognitive load (ACL) of the user. ACL application 150 associates the determined ACL with geolocation data 228 and timestamp data (not shown) corresponding to the location and time when the sensor data 220 associated with the determined ACL was captured by and/or received from sensors 120. Accordingly, ACL application 150 generates ACL data 232, which includes an ACL and corresponding geolocation data 228 and timestamp data. ACL application 150 sends the ACL data 232 to database(s) 142 and/or data store 162 for storage. In some embodiments, ACL application 150 also sends ACL data 232 to navigation application 152. In some other embodiments, navigation application 152 retrieves ACL data 232 from database(s) 142 and/or data store 162.

In various embodiments, biometric computation module 220 receives sensor data 222 from sensor(s) 120. Biometric computation module may include separate modules that analyze portions of sensor data 222 in order to provide cognitive load 224 and/or emotion metrics 226 (e.g., arousal, valence, and/or dominance). In some embodiments, modules 214, 216 may analyze the same portions of sensor data. For example, cognitive load computation module 214 and emotion computation module 216 may separately receive image data included in sensor data 222. In such instances, cognitive load computation module 214 may analyze the image data using various pupillometry techniques and/or eye motion data to determine cognitive load 224, while emotion computation module 216 may analyze the image data to determine the facial expression, classify the facial expression as a pre-defined emotion, and acquire emotion metrics 226 corresponding to the pre-defined emotion.

Affective-cognitive load computation module 230 applies various algorithms to determine an affective-cognitive load as a function of cognitive load 224 (CL) and the emotion metrics 226 that form an affective load (AL), where ACL=f (CL, AL). In various embodiments, a set of ACLs may be stored in database(s) 142. In some embodiments, affective-cognitive load computation module 230 may refer to one or more lookup tables in order to find an entry corresponding to the values for cognitive load 224 and emotion metrics 226 and may determine a corresponding ACL included in the entry. Upon determining the ACL, ACL application 150 generates ACL data 232 by associating the ACL with the corresponding geolocation data 228 and timestamp data.

In various embodiments, affective-cognitive load computation module 230 may use various algorithmic techniques to compute an ACL value from one or more of cognitive load 224 (CL) and/or emotion metrics 226, including a valence value (V), and an arousal value (A). In some embodiments, affective-cognitive load computation module 230 may select a specific algorithm to employ in order to emphasize one metric relative to other metrics. For example, affective-cognitive load computation module 230 could emphasize cognitive load 224 relative to emotion metrics 226 by applying equation 1 or equation 2 (where the offset value modifies the ACL relative to a specific threshold). In such instances, the squared value of CL causes cognitive load 224 to be the major indicator of ACL.

$$ACL = \left(\frac{1}{CL^2} \times \frac{1}{A}\right) \times V \qquad (1)$$

-continued $$ACL = \left(\frac{1}{(CL-0.5)^2} \times \frac{1}{A}\right) \times V \qquad (2)$$

In another example, affective-cognitive load computation module 230 could apply equation 3 such that the ACL is based on a combination of cognitive load 224 and the arousal value, which is modified by whether the valence value is positive or negative.

$$ACL = (CL+A) \times V \qquad (3)$$

In some embodiments, affective-cognitive load computation module 230 weighs certain values in order to emphasize a specific range of values. For example, affective-cognitive load computation module 230 could apply equation 4 or 5 in order to emphasize that positive valence values are more desirable than negative valence values.

$$ACL = \left(\frac{1}{CL} + \frac{1}{A}\right) \times V \qquad (4)$$

$$\frac{1}{ACL} = CL + A \times \left(\frac{1}{V+1}\right) \qquad (5)$$

In some embodiments, one metric may be excluded. For example, affective-cognitive load computation module 230 could apply equation 6 such that the ACL is based on cognitive load 324 and the arousal value while ignoring the valence value.

$$\frac{1}{ACL} = CL + A \qquad (6)$$

In various embodiments, affective-cognitive load computation module 230 may adjust the selected algorithm and/or equation when computing the ACL. In such instances, affective-cognitive load computation module 230 may periodically select a different algorithm and/or different equation. For example, when traffic is light, affective-cognitive load computation module 230 can initially select an algorithm that emphasizes cognitive load 224. When traffic is heavy, affective-cognitive load computation module 230 may select a different algorithm that weighs valence values more heavily and/or indicates that positive valence values are more desirable than negative valence values. Additionally or alternatively, affective-cognitive load computation module 230 may select an algorithm or technique for computing ACL that incorporates additional metrics (e.g., an algorithm that computes an ACL from an arousal value, a valence value, and a dominance value).

In some embodiments, affective-cognitive load computation module 230 may incorporate other measurements associated with the user. In some embodiments, affective-cognitive load computation module 230 may derive measures of a level of focus and/or engagement by simultaneously analyzing a combination of cognitive and emotional information. For example, affective-cognitive load computation module 230 could employ various statistical methods, machine-learning (ML) methods, state machines, and/or various other data structures in order to determine how results of focus and engagement (and/or other user metrics), are derived from cognitive load 224, and/or emotion metrics 226.

Additionally or alternatively, ML models may be trained from any combination of cognitive load 224, emotion metrics 226, and/or other metrics. The ML models may be trained to predict specific higher-order states of the user, such as a driver attending to a specific driving task. The ML model may then be able to generate values, such as an engagement metric. For example, navigation application 152 could receive an engagement metric, modeled from affective and cognitive signals, indicating the engagement level of a driver. In such instances, the engagement metric may be used by navigation application 152 to determine whether to determine and offer alternate routes.

Navigation Sub-System

Figure 3:
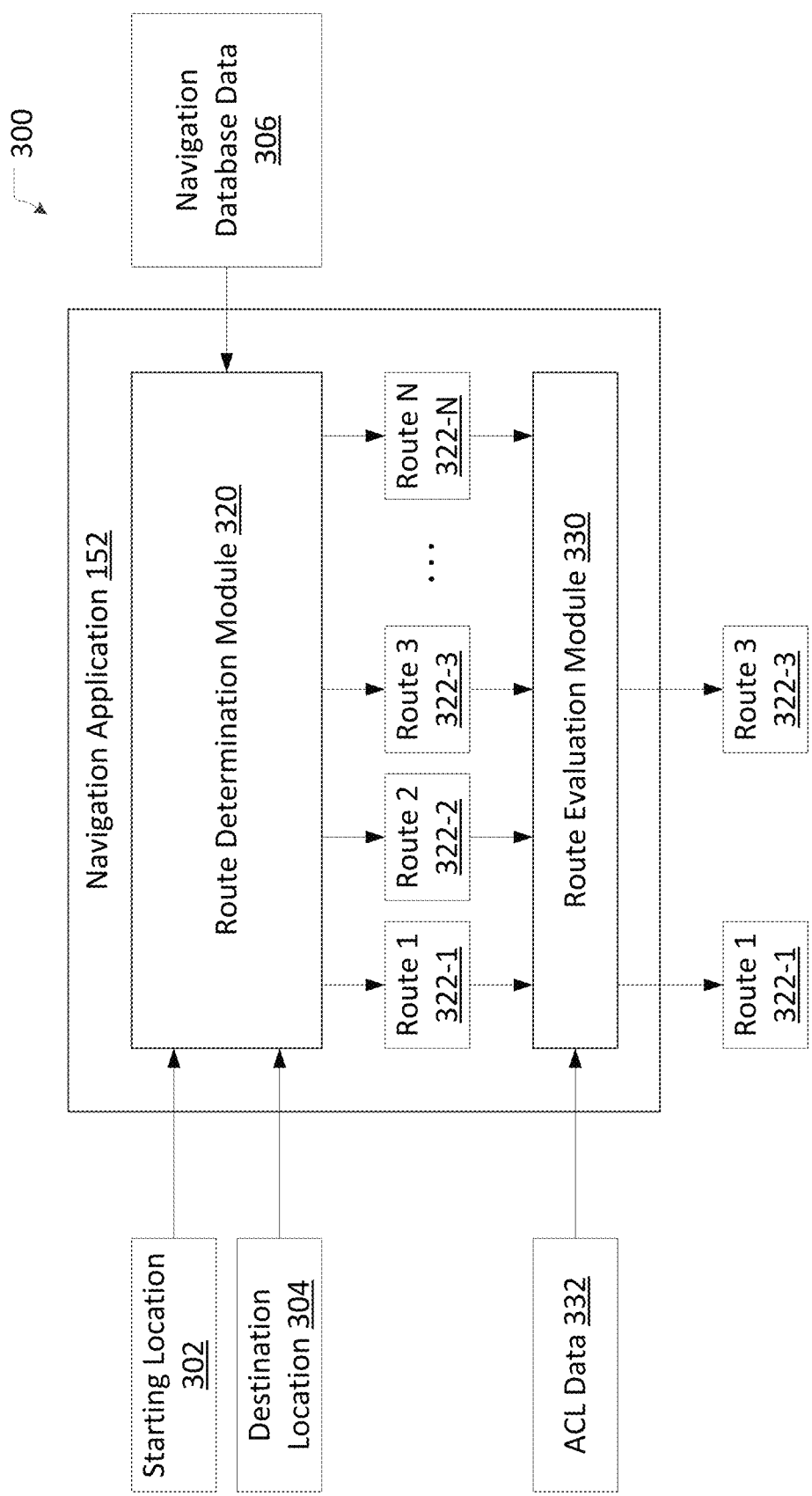
FIG. 3 illustrates a block diagram of the navigation application of FIG. 1, according to various embodiments.

FIG. 3 illustrates a navigation sub-system 300 included in the navigation system 100 of FIG. 1, according to various embodiments. As shown, navigation sub-system 300 includes navigation application 152. Navigation sub-system 300 further includes database(s) 142 and/or data store 162 (not shown in FIG. 3), from which certain data used by navigation application 152 could be retrieved. In various embodiments, navigation application 152 includes route determination module 320 and route evaluation module 330.

As described above, affective-cognitive loads (ACLs) of multiple drivers, associated with various locations and dates/times, can be determined and stored. ACLs of drivers are indicative of the cognitive and/or emotional quality (e.g., ease or difficulty) of a road or route. That is, the ACLs are indicative of how cognitively and/or emotionally burdensome, demanding, or challenging driving on a certain road or route can be for drivers. For example, a "scenic" route through hills may be easier cognitively and/or emotionally compared to a highway stretch with buildings on both sides of the highway. As another example, certain on-ramps or off-ramps may be more challenging cognitively and/or emotionally to drivers because of the configuration of the on-ramp or off-ramp (e.g., a short merge into on-ramp traffic to get into an off-ramp). As a further example, construction may have caused temporary or permanent changes to the lane configuration of a stretch of highway, making driving through that stretch more cognitively and/or emotionally demanding at least for a period while drivers adapt. Accordingly, ACLs experienced by different drivers and associated with various locations and dates/times can be a measure of the cognitive and/or emotional quality (which may also be referred to as "affective-cognitive quality" or "AC quality") of a road or route; ACLs of multiple drivers can serve as crowdsourced information on the AC quality of roads and routes.

However, a drawback of conventional navigation systems is that AC quality is not accounted for at all. That is, conventional navigation systems do not take AC quality into account when selecting routes to be offered to the user, and indeed conventional navigation systems are typically not aware at all of the AC quality of roads and routes. Furthermore, conventional navigation systems are not aware of whether the user cares for a route that is higher in AC quality (e.g., "easy," less cognitively and/or emotionally burdensome, demanding, or challenging). Without that awareness, conventional navigation systems can often provide routes that are lower in AC quality (e.g., "difficult," more cognitively and/or emotionally burdensome, demanding, or challenging) when the driver is not sufficiently prepared or focused to drive through a route low in AC quality.

To address these drawbacks, navigation application 152 evaluates routes based on an ACL criterion, in addition or alternatively to other criteria. For example, in response to a user request for routes to a destination location, navigation application 152 can evaluate determined routes based on ACL data 332 retrieved from database(s) 142 and/or data store 162. In particular, navigation application 152 determines an ACL metric for a route and selects for offering to the user routes that have an ACL metric that indicates higher AC quality. That is, navigation application 152 selects routes that are "easier" or less cognitively and/or emotionally burdensome, demanding, or challenging.

In operation, route determination module 320 obtains a starting location 302 and a destination location 304 for navigation. Starting location 302 can be input by the user (e.g., via a user interface of navigation application 152). Additionally or alternatively, navigation application 152 can determine a current location (e.g., current location of computing device 101 as determined via location module 138) as starting location 302. Starting location 302 may be specified as latitude-longitude coordinates, a name of a landmark (e.g., a landmark, a business), and/or as a simple or full address (e.g., a city; a street; a full address with city, street, and number). Destination location 304 can also be input by the user (e.g., via a user interface of navigation application 152). Additionally or alternatively, navigation application 152 can determine a destination location 304 based on various information, including for example a user profile and a current time of day (e.g., determining the home of the user as the destination address based on the time being a home commute time of the user). Destination location 304 may be specified as latitude-longitude coordinates, a name of a landmark (e.g., a landmark, a business), and/or as a simple or full address (e.g., a city; a street; an address with city, street, and number).

Route determination module 320 retrieves navigation database data 306 from a navigation database stored in database(s) 142 and/or data store 162. The retrieved navigation database data 306 includes maps, road information, road network information, traffic information, etc. relevant to starting location 302, destination location 306, and locations between starting location 302 and destination location 304. Route determination module 320 analyzes navigation database data 306 to determine one or more possible routes 322-1 thru 322-N, each of which goes from starting location 302 to destination location 304. Each determined route 322 corresponds to a different path from starting location 302 to destination location 304. Route determination module 320 may determine routes 322 using time and distance criteria, optionally traffic information, and optionally additional specific criteria (e.g., no toll bridges per a user setting), in order to filter out extreme cases or certain undesirable routes.

In embodiments in which navigation database data 306 includes road network information in which roads and locations are stored as a mathematical graph of nodes and edges, routes 322 may be determined using any technically feasible graph analysis technique (e.g., Dijkstra's algorithm or any other shortest path algorithm, weighted graph analysis, etc.).

Route evaluation module 330 evaluates the determined routes 322 for AC quality, in addition or alternatively to other criteria (e.g., time, distance). In various embodiments, route evaluation module 330 retrieves ACL data 332 from database(s) 142 and/or data store 162. ACL data 332 includes historical and/or current (e.g., real-time, near real-time, determined in the last hour) ACLs corresponding to locations on the roads included in routes 322. Route evaluation module 330 determines an ACL metric for each route 322 based on ACL data 332.

In various embodiments, route evaluation module 330 segments each route 322 into a predefined number of segments or a predefined number of waypoints. For example, each route 322 could be segmented into 100 equally spaced waypoints or nodes. Route evaluation module 330 retrieves ACL data that includes ACLs corresponding to the locations of the segments or waypoints. For example, for a given waypoint, route evaluation module 330 retrieves ACLs whose location information indicates a location corresponding to the waypoint or within a predefined distance tolerance from the waypoint location on the route (e.g., +/−10 meters from the waypoint location on the route). As another example, for a given segment, route evaluation module 330 retrieves ACLs whose location information indicates a location anywhere on the segment. Route evaluation module 330 then determines (e.g., calculates) an aggregate ACL for the segment or waypoint. In some embodiments, the aggregate ACL for a waypoint is the mean (e.g., arithmetic mean), mode, or median ACL of the ACLs retrieved for the segment or waypoint.

As described above, ACL data 332 may include historical ACLs and current ACLs (e.g., ACLs determined within the last half-hour or the last hour) from previously recorded ACL data for the user and/or from multiple crowdsource users. In some embodiments, when determining the aggregate ACL for a waypoint, historical ACLs and current ACLs may be weighted differently. For example, an aggregate historical ACL could be determined using just the historical ACLs (e.g., a mean of the historical ACLs), and an aggregate current ACL could be determined using just the current ACLs (e.g., a mean of the current ACLs). Then, an aggregate ACL for the waypoint could be determined as a weighted arithmetic mean of the aggregate historical ACL and the aggregate current ACL. The weighting may be even, weighted in favor of the aggregate historical ACL (e.g., weighting in favor of historical ACL trends and patterns), or weighted in favor of the aggregate current ACL (e.g., weighting in favor of current ACL conditions).

In various embodiments, route evaluation module 330 retrieves ACL data 332 associated with a time of day, the day of the week, and/or a calendar period that is proximate to the current time and/or date. For example, if the current time is 3:38 PM, then route evaluation module 330 could retrieve ACL data 332 that includes ACLs having timestamps indicating times in the 3:00 PM hour or within a period of an hour after 3:38 PM. As an example, if the current day of the week is Wednesday, then route evaluation module 330 could retrieve ACL data 332 that includes ACLs having timestamps indicating a Wednesday. As a further example, route evaluation module 330 could retrieve ACL data 332 that includes ACLs having timestamps within a past calendar period from the current date (e.g., the past week, the past month, the past six months, the past year, year-to-date, month-to-date). By retrieving ACL data that is proximate to the current time and/or date, route evaluation module 330 can obtain ACL data that may be more relevant to the current navigational circumstances of the user.

In some embodiments, route evaluation module 330 retrieves just ACL data 332 associated with the user. That is, the retrieved ACLs are ACLs determined based on sensor data measuring various characteristics of the user as the driver of a vehicle. In some embodiments, route evaluation module 330 retrieves ACL data 332 associated with multiple drivers, which may include the user. For example, historical ACL data stored in data store 162 could include ACLs that were determined for different drivers at various locations and times. Route evaluation module 330 can accordingly retrieve ACL data based on location and time, disregarding the driver for which a given ACL was determined. To this effect, ACL data stored in database(s) 142 and/or data store 162 may include non-personalized ACL data and personalized ACL data. Non-personalized ACL data include ACLs that are not associated with any specific driver (e.g., anonymized), but still are associated with specific locations and times per the location and timestamp information. Non-personalized ACL data may be provided for usage of navigation system 100 by any user. Personalized ACL data include ACLs that are associated with specific drivers (e.g., not anonymized). Personalized ACL data may be provided for usage of navigation system 100 by the corresponding user but not other users.

Accordingly, as described above, route evaluation module 330 obtains, for a given route 322, ACL data 332 that is limited to locations on the route 322, and which may be limited to certain times, days, and/or dates and/or limited to the current user. Using the obtained ACL data 332, route evaluation module 330 determines one or more ACL metrics for the given route 322. In some embodiments, the ACL metrics include a sum of the aggregate ACLs of the segments or waypoints of the given route 322. That is, the ACL metric could include a cumulative aggregate ACL for the route. In some embodiments, the ACL metrics include a mean (e.g., arithmetic mean), mode, or median of the aggregate ACLs of the segments or waypoints of the given route 322. In some embodiments, the ACL metrics included a weighted sum or mean of the aggregate ACLs of the segments or waypoints of the given route 322. For example, the aggregate ACL of each segment or waypoint could be weighted based on an estimated speed or time for traversing that segment or waypoint (e.g., an aggregate ACL for a segment with heavy traffic is weighted more heavily, reflecting the fact that a driver will spend more time within that segment and thus potentially be affected cognitively and/or emotionally by that segment more than a segment with light traffic). Route evaluation module 330 can determine the estimated speed or time based on traffic information (e.g., real-time traffic information, historical traffic information). The ACL metrics are measures of the AC quality of the given route 322. For example, a lower ACL metric value corresponds to a higher or better AC quality (e.g., a lower cumulative or mean attentive-cognitive load is easier for the user and thus has a higher/better AC quality than a higher cumulative or mean attentive-cognitive load). Route evaluation module 330 can determine the ACL metric for each route 322-1 thru 322-N.

In some embodiments, route evaluation module 330 selects one or more of routes 322 that have the highest or best AC quality (e.g., comparing the AC qualities of the routes with each other), without consideration of other criteria. For example, route evaluation module 330 could select a subset of routes 322 strictly based on the ACL metrics (e.g., lowest cumulative aggregate ACL, lowest mean aggregate ACL, and/or the like).

In some embodiments, route evaluation module 330 can select one or more of routes 322 that have an AC quality better than a current or recent ACL of the user. For example, route evaluation module 330 could obtain current and/or recent ACL data of the user and compare the ACL metrics (e.g., the mean/mode/median of the aggregate ACLs of a route) of routes 322 to the current or recent ACL of the user. Route evaluation module 330 can select a route whose ACL metric is lower than the ACL of the user or maximum desired ACL of the user.

In some embodiments, route evaluation module 330 selects one or more of routes 322 that have the highest or best AC quality (e.g., comparing the AC qualities of the routes with each other), in conjunction with other criteria (e.g., one or more of the conventional criteria, such as distance and time to destination in view of traffic conditions). For example, route evaluation module 330 could select a subset of routes 322 using a weighted function that weighs AC quality, distance, and time with different weights. The weights may be predefined and/or configurable by the user. For example, a user interface of navigation application 152 may include a slider or other user interface element where the user can adjust how much weight to give to AC quality versus other criteria (e.g., time and distance). Accordingly, in this multi-criteria selection technique, the selected routes 322 may not necessarily have the lowest ACL metrics among routes 322.

In some embodiments, route evaluation module 330 selects one or more of routes 322 based on one or more criteria (e.g., distance, time to destination in view of traffic conditions), without regard for AC quality. For example, route evaluation module 330 could select a subset of routes 322 based on time and distance, disregarding the ACL metrics. However, even for these selected routes, AC quality information may be provided, as described below.

In some embodiments, route evaluation module 330 can compare the ACL metrics to a threshold. Routes 322 whose ACL metric is above the threshold (e.g., an excessively high cumulative ACL, indicating an AC quality below a threshold level) can be eliminated from selection. Accordingly, this elimination can be a first pass in the route selection process to filter out unacceptable routes from further consideration. Additionally or alternatively, route evaluation module 330 can also compare the distances and/or durations (e.g., estimated time to destination) of routes 322 against corresponding thresholds. Routes whose distance and/or duration is above the distance threshold or the duration threshold, respectively, can be eliminated from selection.

In some embodiments, route evaluation module 330 generates AC quality information for a selected route 322. For example, route evaluation module 330 could, using a lookup table, a mapping function, or any other technically feasible technique, map the ACL metric for a selected route to an AC quality rating. The absolute and/or relative AC quality rating for a route may be represented via a numerical value (e.g., a score), a color code (e.g., different colors and/or different color shades), words and/or phrases (e.g., "easiest," "relaxed," "hardest," "demanding," "not as easy," "not as hard," "easier," "harder," etc.). and/or an AC quality icon (e.g., an emoji). Route evaluation module 330 can thus generate an AC quality rating for the route as a whole. Route evaluation module 330 could further, using a lookup table, a mapping function, or any other technically feasible technique, map the segment or waypoint aggregate ACLs for a selected route to a color code, thus mapping each segment or waypoint on the route to a color and/or a color shade. Route evaluation module 330 can thus generate AC quality ratings per portion (e.g., per segment or waypoint) of the route by color-coding the portions, similar to the color-coding of portions of roads on a map based on traffic conditions. The lookup tables and/or mapping functions could be stored in database(s) 142 and/or data store 162.

As shown in FIG. 3, route evaluation module 330 has selected routes 322-1 and 322-3 from amongst routes 322-1 thru 322-N, based on any of the selection techniques described above. Navigation application 152 can then transmit the selected routes for presentation to the user. For example, navigation application 152 could transmit output to display device 134 that includes a map and a visualization of the selected routes (e.g., tracings of the selected routes on the corresponding roads) on the map. Navigation application 152 further transmits AC quality information (e.g., AC quality rating for the route as a whole, AC quality rating per segment or waypoint of the route) for the selected routes along with the selected routes. The AC quality information are output to the user along with the selected routes. Navigation application 152 can also transmit other information associated with the selected routes (e.g., total distance of a route, total duration or estimated time to destination of a route) along with the selected routes for output and the AC quality information. Examples of outputs of selected routes are further described below in conjunction with FIGS. 4A-4B.

It should be appreciated that, while the route determination and selection techniques described above are described with respect to an affective-cognitive load that combines cognitive load and emotional load, similar techniques in which cognitive load and emotional load are considered separately could be used. That is, the techniques described above are adaptable to treat cognitive load and emotional load as separate parameters that can be weighed differently, instead of being combined into an affective-cognitive load.

It should also be appreciated that the route determination and selection techniques described above may be combined. That is, the route determination also accounts for the criteria described above for route selection. For example, aggregate ACLs could be determined for at least a portion of the road network graph and the aggregate ACLs could serve as edge distances in the graph analysis for route determination.

In some embodiments, the weight of AC quality versus other criteria, and/or the weights of historical ACLs and of current ACLs, can be personalized to the user. That is, each user of navigation application 152 has his own configured set of weights for emphasizing or deemphasizing AC quality, historical ACL, and/or current ACLs.

In some embodiments, route determination module 320 also determines and/or generates, using any technically feasible technique, navigation instructions (e.g., detailed instructions, turn-by-turn instructions) for routes 322. The navigation instructions for a route gives guidance to a user for traversing the route from starting location 302 to destination location 304. Route determination module 320 can determine and/or generate instructions for a route concurrent with determining the route, after determining the route, or after the route has been selected by route evaluation module 330. The navigation instructions can include instructions in one or more formats (e.g., text, speech audio data, visual indicators or cues, haptic or mid-air haptic cues, and/or the like).

In some embodiments, navigation application 152 can operate in different modes that may be chosen by the user. For example, in a first mode, navigation application 152, in particular route evaluation module 330, selects routes 322 based on AC quality, alone or in conjunction with other criteria, as described above. In a second mode, route evaluation module 330 selects routes 322 based on other criteria, disregarding AC quality. As another example, in both a first mode and in a second mode, route evaluation module 330 selects routes 322 based on AC quality in conjunction with other criteria. But, in the first mode, AC quality is weighted significantly higher than in the second mode, versus the other criteria (e.g., AC quality is weighted 50% in the first mode and 10% in the second mode). Accordingly, the different modes correspond to how much weight or emphasis is placed on AC quality. For example, AC quality could be emphasized (e.g., weighted relatively highly) in the first mode and could be de-emphasized (e.g., weighted relatively lowly, completely disregarded) in the second mode. Further, in some embodiments, navigation application 152 can determine and select routes under both the first modes and the second modes, and offer routes determined and selected according to both modes to the user. For example, navigation application 152 could select the easiest route according to the first mode and select the fastest mode according to the second mode. Navigation application 152 could offer both selected routes to the user, along with associated AC quality information, thereby enabling the user to compare the time, distance, and/or AC quality of the easiest route vs. the fastest route.

Figure 4A:
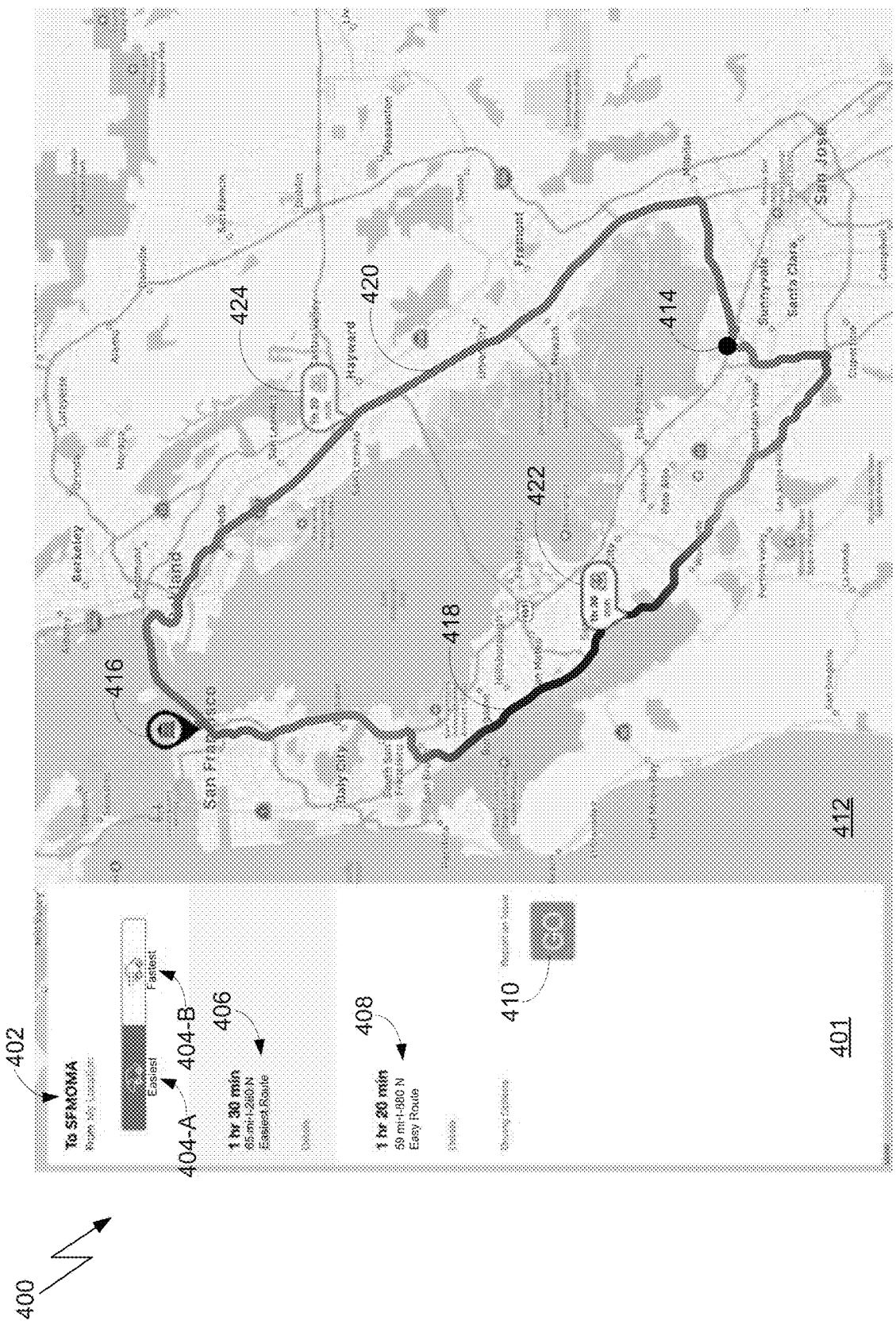
FIGS. 4A-4B illustrate example user interfaces of the navigation application of FIG. 1, according to various embodiments.
Figure 4B:
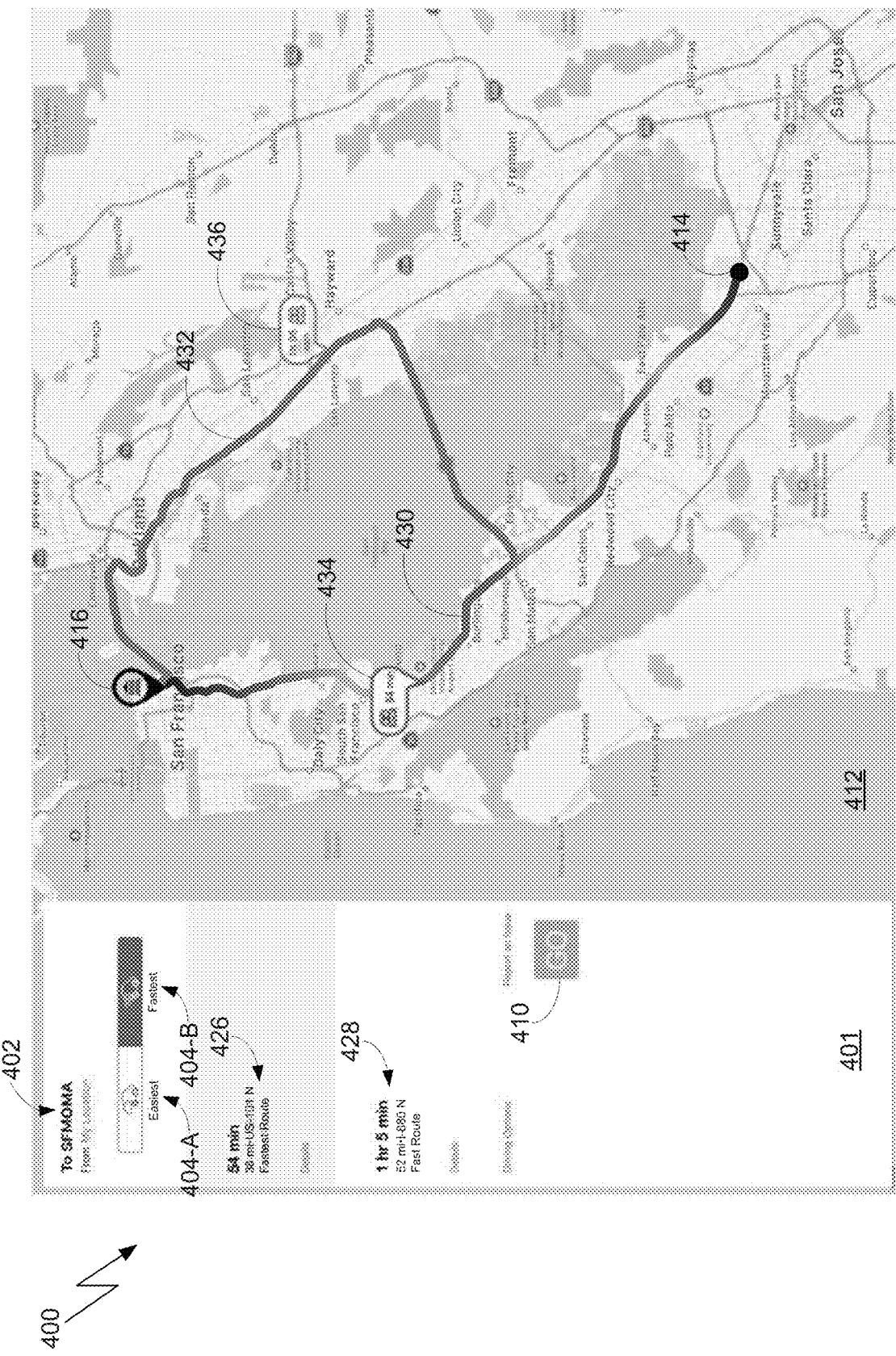

FIGS. 4A-4B illustrate example user interfaces of navigation application 152, according to various embodiments. Navigation application 152 can present routes to a user via a user interface 400. As shown, user interface 400 includes an information area 401 and a map 412. Information area 401 includes navigation location information 402, which indicates the starting location and destination location (e.g., starting location 302 and destination location 304, respectively) for which routes are requested by a user. Information area 401 also includes a mode selector and indicator 404. Mode indicators 404 indicate the mode in which navigation application 152 is currently operating. Mode indicators 404 include a first mode indicator 404-A corresponding to a first mode and a second mode indicator 404-B corresponding to a second mode. A user may select a mode to make active by selecting (e.g., clicking or tapping on) the indicator 404 for the desired mode, and the indicator 404 of the active mode is highlighted. For example, as shown indicator 404-A is highlighted. That is, navigation application 152 is currently operating in the first mode.

As shown in FIG. 4A, the first mode corresponds to the "easiest" mode, and the second mode corresponds to the "fastest" mode. The "easiest" mode is a mode in which AC quality is emphasized for route selection (e.g., the first mode described above in conjunction with FIG. 3), and the "fastest" mode is a mode in which AC quality is de-emphasized for route selection (e.g., the second mode described above in conjunction with FIG. 3). Thus, the user can choose whether user interface 400 presents routes selected for AC quality or routes selected for shortest distance and/or time to destination.

As shown in FIG. 4A, map 412 includes a starting location marker 414 and a destination location marker 416. Two routes, routes 418 and 420, from starting location marker 414 to destination location marker 416 are presented (e.g., traced) on map 412. In accordance with the first mode that is active, routes 418 and 420 are selected with an emphasis on AC quality. Information 406 and 408 (e.g., distance, estimated time to destination, notable roads on the route (e.g., major highways and/or streets)) for routes 418 and 420, respectively, are displayed in information area 401. For example, route information 406 corresponds to route 418 and route information 408 corresponds to route 420. Route information 406 includes an indication that route 418 is the easiest route (e.g., having the best ACL metric among determined routes 322). Route information 408 includes an indication that route 420 is an easy route (e.g., having an ACL metric that is not the best among determined routes 322 but still better than at least some of the determined routes 322). As indicated by route information 406 and 408, route 418 is easier but not as fast as route 420.

The user can select one of routes to see detailed instructions and/or further information for the route, and/or to begin navigating the route. For example, the user can select route 418 by selecting (e.g., clicking or tapping on) any of route 418 on map 412, callout 422 on map 412, or route information 406 in information area 401; and then selecting "GO" button 410. In response to selection of "GO" button 410, navigation application 152 displays detailed instructions for the selected route 418 in user interface 400.

On map 412, AC quality information, which can be generated by route evaluation module 330, can be displayed along with the routes. For example, as shown in FIG. 4A, different portions of routes 418 and 420 could be color-coded to indicate the AC quality ratings of the different portions (e.g., aggregate ACLs of the segments or waypoints), similar to color-coding of portions of roads to indicate traffic conditions. As shown in FIG. 4A, on map 412 selected route 418 is color-coded to indicate the AC quality ratings of portions of the route, and not-selected route 420 is grayed-out. Additionally, a callout 422 could be displayed for route 418, and a callout 424 could be displayed for route 420. Callout 422 includes the estimated time to destination of route 418, and an AC quality icon indicating the AC quality of route 418. Callout 424 includes the estimated time to destination of route 420, and an AC quality icon indicating the AC quality of route 420. In some embodiments, the AC quality icon is an emoji to which the AC quality of a route is mapped. For example, a smiley face emoji icon could indicate an easy route, and a sad face emoji icon could indicate a difficult route. Further, in some embodiments, the icon can be color-coded based on the AC quality of the corresponding route. The color-coding may include different colors and/or different color shades (e.g., lighter vs. darker shade of the same color). For example, for the two routes 418 and 420 shown in FIG. 4A, their corresponding AC quality emoji icons in callouts 422 and 424, respectively, are color-coded differently.

FIG. 4B also shows user interface 400 of navigation application 152 and routes from the same starting location 414 to the same destination location 416 as in FIG. 4A, but mode indicator 404-B is highlighted. Highlighted mode indicator 404-B indicates that navigation application 152 is operating in the second, "fastest" mode in which routes are selected with a de-emphasis on AC quality. Accordingly, different routes 430 and 432, selected for being the fastest routes in accordance with the second mode, are displayed on map 412. Route information 426 in information area 401 corresponds to route 420, and route information 428 corresponds to route 432. Selected route 430 is color-coded to indicate the AC quality ratings of portions of the route, and not-selected route 432 is grayed-out.

Callout 434 for route 430 and callout 436 for route 432 both include sad face emoji icons indicating that routes 430 and 432 have low AC quality. As shown, the emoji icons for routes 430 and 432 are color-coded to different shades of the same color, with the icon for route 432 color-coded to a lighter shade, which indicates that route 432 is less difficult than route 430.

In some embodiments, navigation application 152 can generate and output AC quality information without the requirement of there being a determined or selected route. That is, the AC quality information need not necessarily be associated with a specific route form a starting location to a destination location. For example, navigation application 152 could determine AC quality ratings of portions of roads (e.g., per segment or waypoint on the roads) in a map region and display the ratings in map 412 via color-coding of portions of roads, similar to the AC quality color-coding along a route as described above. Additionally or alternatively, the AC quality ratings of roads can be displayed in the form of a heat map on map 412. The heat map can indicate regions where high-AC quality roads are prevalent and regions where low-AC quality roads are prevalent. Accordingly, navigation application 152 can display visualizations (e.g., icons, color-coding, heat map, etc.) of AC quality with or without a specific route.

It should be appreciated that specific examples of AC quality scores, colors, or icons (e.g., emoji) described above are merely exemplary. The above-described techniques may use any suitable mapping scheme of mapping AC quality to numerical values, colors, and/or icons.

Accordingly, according to the above-described techniques, navigation application 152 provides AC quality information of roads to a user. For example, in response to a user request for routes from a starting location to a destination location (e.g., via a navigation application 152 on a smartphone or in a vehicle), navigation application 152 could provide AC quality information associated with the routes and even select routes based on AC quality. As another example, navigation application 152 could display AC quality information for roads in a map region of a map (e.g., in a navigation application 152 accessed via a desktop or laptop computer), similar to a map displaying traffic conditions on roads.

While FIGS. 4A-4B describes graphical user interfaces of navigation application 152, and information presented by navigation application 152, that may be displayed on a display device 134 (e.g., a vehicle infotainment system display, a display of a desktop or laptop computer, a smartphone display, a tablet display), navigation application 152 may include user interfaces and present information (e.g., AC quality information, route information, etc.) in additional and/or alternative modalities. For example, navigation application 152 could output route information and AC quality information for display on a heads-up display and/or a head-mounted display. As another example, navigation application 152 could present information (e.g., AC quality information, route information, etc.) in conjunction with a voice interface (e.g., a personal assistant application associated with computing device 101, a natural language processing module associated with computing device 101, etc.). A user could ask the voice interface a question related to navigation (e.g., "What roads should I take to SFMOMA?"). Navigation application 152, in conjunction with the voice interface, would process the question as a request for routes from the current location to SFMOMA. Navigation application 152 would determine and select routes as described above, and determine the AC quality information for the routes. Navigation application 152, in conjunction with the voice interface, could present one or more routes and associated AC quality information to the user in the form of speech output via speaker 132 (e.g., "Easiest route is I-280 N which takes 1 hour 30 minutes; fastest would be 101 N, which is 36 minutes faster—but not as relaxed as I-280 N.").

Figure 5:
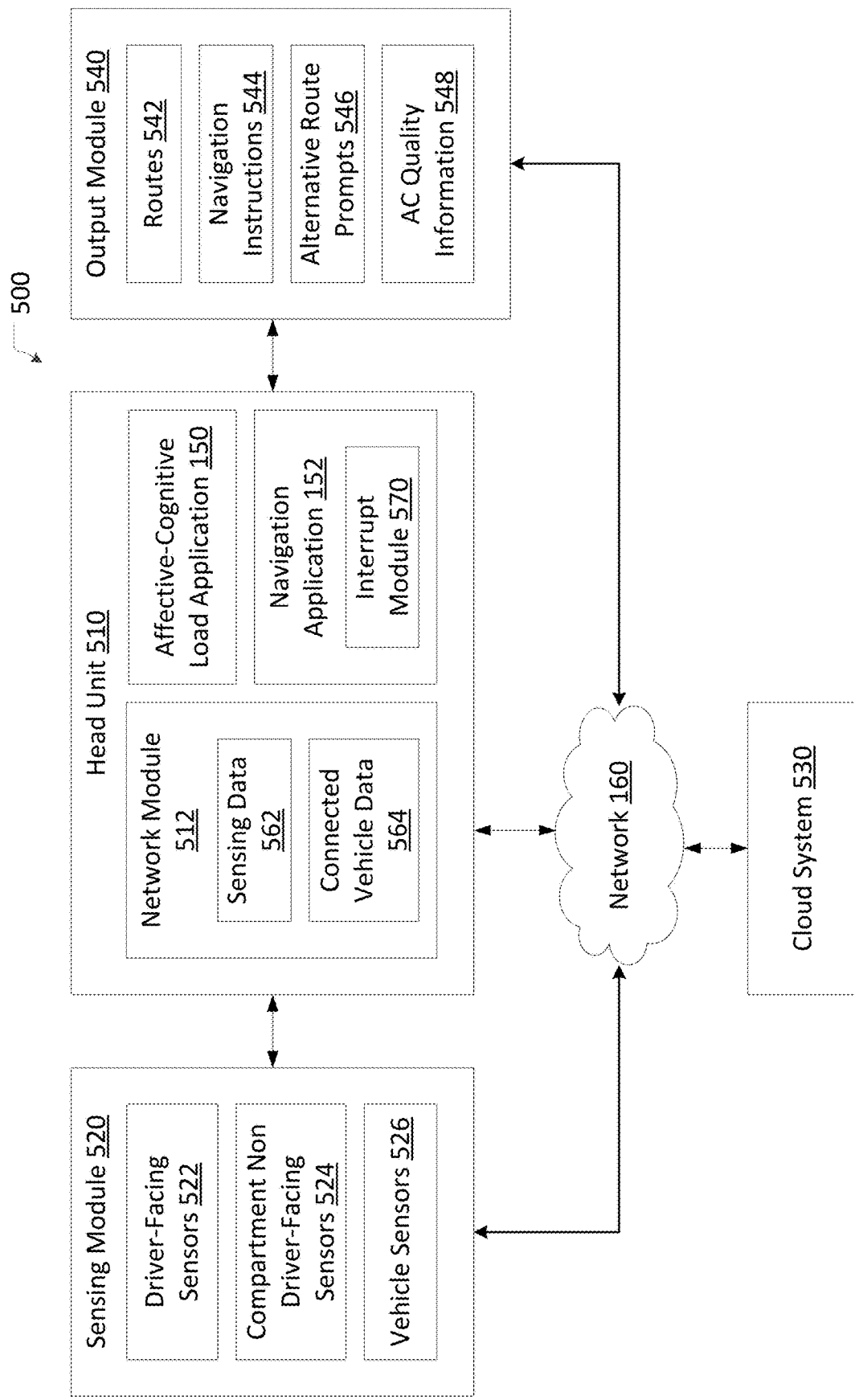
FIG. 5 illustrates an example vehicle system that includes the navigation application and the attentive-cognitive load application of FIG. 1, according to various embodiments.

FIG. 5 illustrates an example vehicle system 500 that includes an affective-cognitive load sub-system 200 of FIG. 2 and navigation sub-system 152 of FIG. 2, according to various embodiments. As shown, vehicle system 500 includes sensing module 520, head unit 510, network 160, output module 540, and optionally a cloud system 530. Sensing module 520 includes driver-facing sensors 522 (e.g., a camera), compartment non-driver-facing sensors 524 (e.g., steering wheel sensors, pedal sensors, etc.), and vehicle sensors 526 (e.g., speedometer, accelerometer, etc.). Head unit 510 includes navigation application 152, ACL application 150, and network module 512. Output module 540 includes routes 542, navigation instructions 544, alternative route prompts 546, and AC quality ratings 548.

In various embodiments, ACL application 150 can receive sensor data from one or more sensors 522, 524, 526 included in sensing module 520 (e.g., sensors 120). In various embodiments, ACL application 150 may further receive data from navigation application 152 and/or network module 512. ACL application 150 analyzes the received data to compute an ACL associated with the cognitive load and emotional state of the driver. In various embodiments, ACL application 150 may send the ACL to cloud system 530 for storage. Cloud system 530 hosts one or more data stores or databases (e.g., data store 162) where ACL values and corresponding location and timestamp information (e.g., ACL data 232) can be stored. Additionally or alternatively, ACL application 150 may send the ACL to storage that is local to head unit 512 (e.g., database(s) 142).

In some embodiments, ACL application 150 transmits ACL values determined for the driver to navigation application 152. Accordingly, navigation application 152 (e.g., interrupt module 570) has access to current ACL values of the driver. Additionally or alternatively, navigation application 152 can obtain current ACL values of the driver from cloud system 530 and/or the storage local to head unit 512.

Sensing module 520 includes multiple types of sensors, including driver-facing sensors 522 (e.g., cameras, motion sensors, etc.), compartment non-driver facing sensors 524 (e.g., motion sensors, pressure sensors, temperature sensors, etc.), and vehicle sensors 526 (e.g., outward-facing cameras, accelerometers, etc.). In various embodiments, sensing module 520 provides a combination of sensor data that describes the context in which combined affective-cognitive load are being observed in more detail. For example, sensing module 520 could provide a set of values associated with the operation of the vehicle (e.g., angular velocity of rear tires, velocity of the pedal movement, velocity of the vehicle, etc.). In such instances, ACL application 150 could determine a cognitive load value and/or an emotional load value based on the received values, such as by comparing the measured velocity of the vehicle compared to the speed limit of the location, and/or the velocity of surrounding vehicles.

In various embodiments, vehicle sensors 526 may further include other external sensors. Such external sensors may include optical sensors, acoustic sensors, road vibration sensors, temperature sensors, etc. In some embodiments, sensing module and/or network module 512 may acquire other external data, such as geolocation data (e.g., GNNS systems, including a global positioning system (GPS), Glonass, Galileo, Beidou, etc.). In some embodiments, navigation data and/or geolocation data may be combined to predict changes to the ACL based on expected driving conditions. For example, an expected traffic jam may cause user ACL application 150 to predict an increase in the ACL upon the vehicle reaching affected area.

Network module 512 translates results of sensor module 520. In various embodiments, network module 512 may retrieve specific values, such as sensing data 562, connected vehicle data 564, and/or historical data (e.g., previous ACLs, calculations that were computed by remote devices, etc.). In some embodiments, network module 512 may transmit data acquired by head unit, such as one or more ACLs, and/or sensing data 562 acquired by sensor module 520. In such instances, one or more devices or systems connected to network 160 may merge data received from network module 516 with data from other vehicles, and/or infrastructure before being consumed by computation modules. For example, one or more devices or systems may accumulate and compile sensing data in order to associate driving conditions with required driver readiness. For example, cloud system 530 could accumulate and compile ACL data 232 received from multiple vehicles, accordingly compiling a database of ACLs experienced by drivers at different locations and dates/times. Cloud system 530 may, by request of navigation application 152, aggregate and/or merge ACL data 232 to determine or calculate certain ACL-related values (e.g., aggregate ACLs, ACL metrics) that may be used by navigation application 152.

Navigation application 152 can generate and output routes and AC quality information. For example, navigation application 152 can determine one or more routes from a starting location (e.g., a user-input location, a current location of the vehicle) to a destination location and determine and/or generate navigation instructions for the routes. Navigation application 152 can select one or more of the routes based on ACL data associated with the routes. Navigation application 152 can determine and select routes, and generate AC quality information, using the techniques described above in conjunction with FIG. 3. Navigation application 152 can send selected routes 542, navigation instructions 544 associated with routes 542, and AC quality information 548 associated with the routes 542 to output module 540. Navigation application 152 can also generate AC quality information not associated with a specific route.

In some embodiments, navigation application 152 further includes an interrupt module 570. While the driver is driving the vehicle on a route 542, navigation application 152 (e.g., interrupt module 570) obtains current ACL data for the driver and determines whether the ACL of the driver exceeds a predefined threshold. If interrupt module 570 determines that the ACL of the driver exceeds the threshold (e.g., an instant ACL value exceeds the threshold, the ACL of the driver has exceeded the threshold for at least a threshold period of time), then interrupt module 570 can cause navigation application 152 to determine an alternate route with a higher AC quality than the remainder of the currently driven route 542. The starting location of the alternate route would be the current location of the vehicle, and the destination location is the same as the currently driven route. Navigation application 152 sends an alternate route prompt 546, along with alternate route 542, to output module 540. Alternate route prompt 546 notifies the driver of availability of the alternate, easier route 542, and prompts the driver with an option to accept or reject the alternate route.

In various embodiments, navigation application 152 may send various information (e.g., routes, AC quality information) to output module 540 that generates one or more output signals. In alternative embodiments, navigation application 152 may generate output signals corresponding to the information. In various embodiments, the information included in the output signals include one or more of routes 542, navigation instructions 544, alternate route prompts 546, and AC quality information 548.

In various embodiments, routes 542 include routes and corresponding information (e.g., starting and destination locations, estimated time to destination, distance, roads on the route), as well as visualizations of the routes (e.g., tracings of the routes on a map).

In various embodiments, navigation instructions 544 include textual, speech, and or visual instruction or guidance content associated with route 542. For example, navigation instructions 544 could include turn-by-turn instructions, in both textual and speech modalities, for a route 542. Navigation instructions 544 can further include trigger points for the instructions (e.g., at which location on the route a particular instruction is to be presented to the driver).

In various embodiments, alternate route prompts 546 include notifications and prompts to the driver that an alternate, easier route is available and that the driver can accept or reject the alternate route.

In various embodiments, AC quality information 548 include AC quality information (e.g., scores, color codes, icons, words and/or phrases) associated with roads and/or routes (e.g., segments or waypoints of a road and/or route). The AC quality information can include information associated with a specific route and/or information not associated with any particular route (e.g., aggregate historical AC quality for a given portion of a road).

Figure 6:
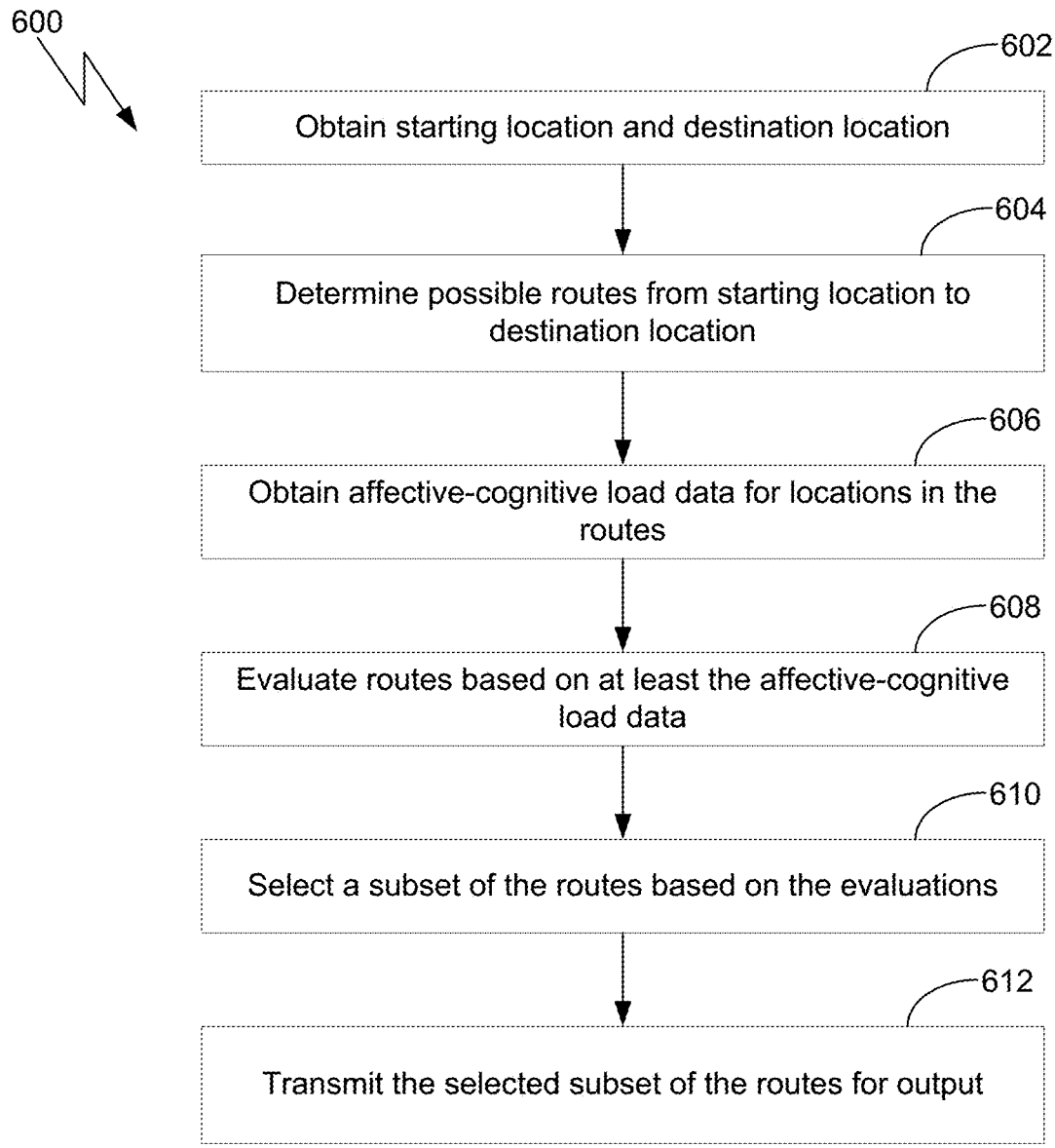
FIG. 6 is a flow diagram of method steps for navigating a route based on attentive-cognitive load, according to various embodiments.

FIG. 6 is a flow diagram of method steps for navigating a route based on attentive-cognitive load, according to various embodiments. Although the method steps are described with respect to the systems of FIGS. 1-5, persons skilled in the art will understand that any system configured to perform the method steps, in any order, falls within the scope of the various embodiments.

As shown, method 600 begins at step 602, where navigation application 152 obtains a starting location and a destination location. In various embodiments, navigation application 152 obtains at least one of the starting location and the destination location via user input (e.g., manual user entry, user selection of a saved address or location). In some embodiments, at least one of the stating location and the destination location can be determined automatically by navigation application 152 (e.g., navigation application 152 determines, via location module 138, the current location of the vehicle as the starting location).

At step 604, navigation application 152 determines possible routes from the starting location to the destination location. Navigation application 152 determines one or more possible routes that go from the starting location to the destination location on roads in a network of roads in a geographic region.

At step 606, navigation application 152 obtains affective-cognitive load data for locations in the determined routes. Navigation application 152 obtains ACL data at locations that the determined routes traverse. The ACL data may be limited to data having timestamps from a certain period. The ACL data may include data specific to the user or include non-personalized data not tied to any particular user or driver.

At step 608, navigation application 152 evaluates the routes based on at least the affective-cognitive load data. Navigation application 152 evaluates the routes for AC quality. For example, navigation application 152 could determine ACL metrics for each of the routes and compare the ACL metrics of the routes.

At step 610, navigation application 152 selects a subset of the routes based on the evaluation. Navigation application 152 selects one or more of the routes based on AC quality, alone or in conjunction with additional criteria. For example, navigation application 152 could select one or more routes that have the best AC quality. Navigation application 152 can weigh the AC quality in the selection differently according to a mode that the user can select. For example, while an "easiest" mode is active, navigation application 152 could select routes 418 and 420 with an emphasis on AC quality. On the other hand, while a "fastest" mode is active, navigation application 152 could select routes 430 and 432 with a de-emphasis on AC quality.

At step 612, navigation application 152 transmits the selected subset of the routes for output. Navigation application 152 sends the routes to an output device for presentation to the user. For example, navigation application 152 could send the selected routes to a display device 134 for display in a user interface 400 of navigation application 152. In some embodiments, navigation application 152 generates a set of navigation instructions (e.g., turn-by-turn directions) for navigating (e.g., driving a vehicle along) the selected route. Navigation application 152 sends the navigation instructions, in one or more formats, to I/O devices 130 for output (e.g., send to display device 134 for display as text and/or other visual indicators or cues, send to speaker 132 for output as speech).

In sum, the disclosed techniques may be used to provide affective-cognitive load based navigation. A computing system includes a navigation application (or sub-system) and optionally an affective-cognitive load application (or sub-system). The navigation application determines possible routes between a starting location and a destination location. The navigation application obtains affective-cognitive load data for locations along the routes from the starting location and the destination location. The navigation application evaluates the routes based on the obtained affective-cognitive load data and selects one or more routes based on an affective-cognitive load metric for offering to the driver. In some embodiments, the affective-cognitive load application determines affective-cognitive loads of a driver of a vehicle at different locations traversed by the vehicle at different times. The affective-cognitive load application transmits the affective-cognitive loads, along with corresponding location and timestamp information, to a local data store and/or a cloud-based data store for storage. The navigation application obtains the affective-cognitive load data for the user or for multiple users from the local data store and/or the cloud-based data store.

At least one advantage and technological improvement of the disclosed techniques is that a navigation application or system determines and offers routes that accounts for the affective-cognitive challenges of the routes. Accordingly, the navigation application or system can offer to a user "easier" routes in which the user can better focus on the driving task without being overburdened cognitively and/or emotionally, thus facilitating the safety and well-being of the user. Another advantage and technological improvement is that affective-cognitive quality information for routes are presented to the user. Accordingly, a user can make a better-informed choice, based on the affective-cognitive needs and desires of the user, regarding which route to take to a destination.

1. In some embodiments, a computer-implemented method comprises obtaining a starting location and a destination location; determining a plurality of routes from the starting location to the destination location; obtaining affective-cognitive load (ACL) data associated with the plurality of routes; selecting a first route included in the plurality of routes based on the ACL data; and transmitting the first route for output.

2. The method of clause 1, wherein obtaining (ACL) data associated with the plurality of routes comprises obtaining ACL data associated with a plurality of locations along the first route.

3. The method of clauses 1 or 2, wherein selecting the first route included in the plurality of routes based on the ACL data comprises determining an aggregate ACL associated with a first location included in the plurality of locations along the first route.

4. The method of any of clauses 1-3, wherein selecting the first route included in the plurality of routes based on the ACL data comprises determining a cumulative ACL associated with the first route.

5. The method of any of clauses 1-4, wherein the ACL data associated with the plurality of routes comprises at least one of historical ACL data or current ACL data.

6. The method of any of clauses 1-5, wherein the ACL data associated with the plurality of routes comprises ACL data associated with a defined time period.

7. The method of any of clauses 1-6, wherein selecting the first route included in the plurality of routes based on the ACL data comprises selecting the first route based on the ACL data in conjunction with one or more additional criteria.

8. The method of any of clauses 1-7, further comprising generating affective-cognitive (AC) quality information associated with the first route; and transmitting the AC quality information associated with the first route for output.

9. The method of any of clauses 1-8, wherein the AC quality information comprises an AC quality rating of the first route.

10. The method of any of clauses 1-9, wherein the AC quality information comprises an AC quality rating associated with a first portion of the first route.

11. In some embodiments, a system comprises a memory storing an application; and a processor that, when executing the application, is configured to obtain a starting location and a destination location; determine a route from the starting location to the destination location; obtain affective-cognitive load (ACL) data associated with the route; generate affective-cognitive (AC) quality information associated with the route based on the ACL data; and transmit the route and the AC quality information for output.

12. The system of clause 11, wherein the ACL data associated with the route comprises ACL data associated with a plurality of portions of the route.

13. The system of clauses 11 or 12, wherein generating the AC quality information comprises determining an aggregate ACL for each portion included in the plurality of portions of the route.

14. The system of any of clauses 11-13, wherein generating the AC quality information comprises mapping an aggregate ACL for a first portion included in the plurality of portions of the route to an AC quality rating associated with the first portion.

15. The system of any of clauses 11-14, wherein generating the AC quality information further comprises determining an ACL metric for the route based on the aggregate ACLs for the plurality of portions of the route.

16. The system of any of clauses 11-15, wherein the system further comprises one or more sensors, and the processor is further configured to determine a user ACL based on data from the one or more sensors; determine that the user ACL exceeds a threshold; in response to determining that the user ACL exceeds the threshold, determine a second route from a second starting location to the destination location; and transmit the second route for output.

17. In some embodiments, one or more non-transitory computer-readable storage media include instructions that, when executed by one or more processors, cause the one or more processors to perform the steps of obtaining a starting location and a destination location; determining a plurality of routes from the starting location to the destination location; obtaining affective-cognitive load (ACL) data associated with the plurality of routes; selecting a subset of the plurality of routes based on the ACL data; and transmitting the subset of the plurality of routes for output.

18. The one or more computer-readable media of clause 17, wherein obtaining (ACL) data associated with the plurality of routes comprises obtaining ACL data associated with a plurality of locations along a first route included in the plurality of routes.

19. The one or more computer-readable media of clauses 17 or 18, including instructions that, when executed by the one or more processors, further cause the one or more processors to perform the steps of generating affective-cognitive (AC) quality information associated with the selected subset of the plurality of routes; and transmitting the AC quality information associated with the selected subset of the plurality of routes for output.

20. The one or more computer-readable media of any of clauses 17-19, including instructions that, when executed by the one or more processors, further cause the one or more processors to perform the steps of receiving a selection of a first route included the plurality of routes; generating a set of navigation instructions associated with the first route; and transmitting, for output, the set of navigation instructions associated with the first route.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   utilizing a processor associated with a vehicle, wherein the processor is configured to:
   obtain a starting location and a destination location, wherein the starting location is obtained from a location module in the vehicle;
   determine from a navigation database a plurality of routes from the starting location to the destination location;
   retrieve from an affective-cognitive load (ACL) database a waypoint ACL value associated with a first waypoint along a first route of the plurality of routes, wherein the waypoint ACL value corresponds to an ACL of a driver traveling through the first waypoint;
   determine a route ACL value for the first route based on at least the waypoint ACL value;
   receive a user input from an input device, wherein the user input selects a first mode of operation from a plurality of modes of operation and wherein each mode of operation included in the plurality of modes of operations corresponds to a respective value for weighting route ACL values;
   compute an evaluation score for the first route by weighting the route ACL value with a first weight and weighting a time or a distance of the first route with a second weight, wherein a value of the first weight and a value of the second weight are determined based on the first mode of operation;
   select the first route from the plurality of routes based on the evaluation score; and
   transmit the first route for output to a display device of the vehicle.

2. The method of claim 1, wherein determining the waypoint ACL value comprises determining an aggregate waypoint ACL value.

3. The method of claim 1, wherein determining the route ACL value comprises determining a cumulative ACL value for the first route.

4. The method of claim 1, wherein the ACL database stores at least one of historical ACL data or current ACL data for the first waypoint.

5. The method of claim 1, wherein the ACL database stores ACL data associated with the first waypoint over a defined time period.

6. The method of claim 1, further comprising:
   determining a user ACL based on data from one or more sensors;
   determining that the user ACL exceeds a threshold;
   in response to determining that the user ACL exceeds the threshold, determining a second route from a second starting location to the destination location; and
   transmitting the second route for output.

7. The method of claim 1, further comprising:
   generating affective-cognitive (AC) quality information associated with the first route; and
   transmitting the AC quality information associated with the first route for output.

8. The method of claim 7, wherein the AC quality information comprises an AC quality rating of the first route.

9. The method of claim 7, wherein the AC quality information comprises an AC quality rating associated with a first portion of the first route.

10. A system, comprising:
    a memory storing an application; and
    a processor that, when executing the application, is configured to:
    obtain a starting location and a destination location, wherein the starting location is obtained from a location module in a vehicle;
    determine from a navigation database a plurality of routes from the starting location to the destination location;
    retrieve from an affective-cognitive load (ACL) database a waypoint ACL value associated with a first waypoint along a first route of the plurality of routes, wherein the waypoint ACL value corresponds to an ACL of a driver traveling through the first waypoint;
    determine a route ACL value for the first route based on at least the waypoint ACL value;
    receive a user input from an input device, wherein the user input selects a first mode of operation from a plurality of modes of operation and wherein each mode of operation included in the plurality of modes of operations corresponds to a respective value for weighting route ACL values;
    compute an evaluation score for the first route by weighting the route ACL value with a first weight and weighting a time or a distance of the first route with a second weight, wherein a value of the first weight and a value of the second weight are determined based on the first mode of operation;

select the first route from the plurality of routes based on the evaluation score; and transmit the first route for output to a display device of the vehicle.

11. The system of claim 10, wherein determining the waypoint ACL value comprises determining an aggregate ACL value associated with the first waypoint.

12. The system of claim 10, wherein determining the route ACL value comprises determining a cumulative ACL value for the first route.

13. The system of claim 10, wherein the processor, when executing the application, is configured to obtain, from the ACL database at least one of historical ACL data or current ACL data associated with the first waypoint.

14. The system of claim 10, wherein the processor, when executing the application, is configured to obtain, for the ACL database, ACL data associated with the first waypoint and with a defined time period.

15. The system of claim 10, wherein the system further comprises one or more sensors, and the processor is further configured to:

determine a user ACL based on data from the one or more sensors;

determine that the user ACL exceeds a threshold;

in response to determining that the user ACL exceeds the threshold, determine a second route from a second starting location to the destination location; and transmit the second route for output.

16. One or more non-transitory computer-readable storage media including instructions that, when executed by one or more processors, cause the one or more processors to perform steps of:

obtaining a starting location and a destination location, wherein the starting location is obtained from a location module in a vehicle;

determining from a navigation database a plurality of routes from the starting location to the destination location;

retrieving from an affective-cognitive load (ACL) database a waypoint ACL value associated with a first waypoint along a first route of the plurality of routes, wherein the waypoint ACL value corresponds to an ACL of a driver traveling through the first waypoint;

determining a route ACL value for the first route based on at least the waypoint ACL value;

receiving a user input from an input device, wherein the user input selects a first mode of operation from a plurality of modes of operation and wherein each mode of operation included in the plurality of modes of operations corresponds to a respective value for weighting route ACL values;

computing an evaluation score for the first route by weighting the route ACL value with a first weight and weighting a time or a distance of the first route with a second weight, wherein a value of the first weight and a value of the second weight are determined based on the first mode of operation;

selecting the first route from the plurality of routes based on the evaluation score; and transmitting the first route for output to a display device of the vehicle.

17. The one or more computer-readable media of claim 16, including instructions that, when executed by the one or more processors, further cause the one or more processors to perform the steps of:

generating affective-cognitive (AC) quality information associated with the first route; and transmitting the AC quality information associated with the first route for output.

18. The one or more computer-readable media of claim 16, including instructions that, when executed by the one or more processors, further cause the one or more processors to perform the steps of:

generating a set of navigation instructions associated with the first route; and transmitting, for output to the display device, the set of navigation instructions associated with the first route.

* * * * *